United States Patent [19]

Onno

[11] 4,397,301
[45] Aug. 9, 1983

[54] METHOD OF CONTROLLING A SOLAR SYSTEM COLLECTOR LOOP

[75] Inventor: Thomas Onno, Ottawa, Canada

[73] Assignee: Canadian Patents & Dev. Limited, Ottawa, Canada

[21] Appl. No.: 296,118

[22] Filed: Aug. 25, 1981

[51] Int. Cl.³ .................................................. F24J 3/02
[52] U.S. Cl. ..................................... 126/422; 126/437; 236/91 F
[58] Field of Search ............... 126/422, 437, 429, 430, 126/436, 452; 236/91 F; 165/485, 40

[56] References Cited

U.S. PATENT DOCUMENTS

| | | | |
|---|---|---|---|
| 3,977,601 | 8/1976 | Bearzi | 126/422 X |
| 4,063,545 | 12/1977 | Hapgood | 165/485 X |
| 4,125,107 | 11/1978 | Nurnberg | 126/422 |
| 4,250,712 | 2/1981 | Meloni | 126/422 |
| 4,256,089 | 3/1981 | Lewis, Jr. et al. | 126/420 |

FOREIGN PATENT DOCUMENTS

| | | | |
|---|---|---|---|
| 1083249 | 8/1980 | Canada | 126/422 |
| 2800173 | 7/1978 | Fed. Rep. of Germany | 126/422 |
| 2814243 | 10/1979 | Fed. Rep. of Germany | 126/422 |

Primary Examiner—Samuel Scott
Assistant Examiner—Randall L. Green
Attorney, Agent, or Firm—Edward Rymek

[57] ABSTRACT

In a solar system collector loop, having a solar collector with an absorber plate, a heat storage unit and a pump for circulating a fluid between the collector and the storage unit, the stagnation temperature $T_Q$ of the collector absorber plate, the temperature $T_C$ of the collector absorber plate, and the storage temperature $T_S$ in the storage unit are measured. The stagnation temperature is measured by a heat flux transducer based on a small sample of the absorbed plate which is thermally isolated from the collector but in the same enclosure. This transducer generates temperatures near the stagnation condition for the instantaneous operating point. In the method of control, the pump is turned on when the temperature difference between the absorber plate $T_C$ or $T_Q$ and the storage $T_S$, is greater than a predetermined value $T_{on}$. The pump is turned off when the temperature difference between the stagnation temperature $T_Q$ and collector absorber plate $T_C$ is smaller than a predetermined value $T_{off}$. The temperature signals $T_Q$, $T_C$ and $T_S$ may also be used to control obvious abnormalities in the system as well as fast radiation changes such as those caused by small clouds.

4 Claims, 3 Drawing Figures

METHOD OF CONTROLLING A SOLAR SYSTEM COLLECTOR LOOP

BACKGROUND OF THE INVENTION

This invention is directed to the control of a solar collector loop and, in particular, to a method for providing stable control at low levels of radiation.

The major problem in control of a collector loop is at the turn-off point, when differential temperature across the collector is at a minimum. Under this condition, slight drift in measurements can lead to cycling instability or cause the system to run through the night, with the associated heat loss and danger of freezing in the case of a drainback system.

The conventional low cost method of controlling the pump in a solar collector is dependent on the temperature difference T between the outlet end of the collector absorber plate and the bottom of storage. It is preferred that the turn-on and turn-off temperature be as close and as low as possible to maintain a collection efficiency. However, in view of the limited accuracy and the drift problems in low cost temperature sensors, the turn-off $\Delta T$ will always be greater than 1.0° C. and a substantial amount of hysteresis must be introduced into the system. For instance, the turn-on $\Delta T$ value is about six times greater than the turn-off value. However, hysteresis inherently reduces system efficiency by forcing the collector to spend part of the time at higher than normal operating temperature, while frequent stop-start cycles add to the wear on the system.

Since $\Delta T$ is an inverse function of the flow rate, methods have been developed in which the speed of the pump is varied. In principle, as $\Delta T$ across the collectors falls, the pump is slowed down and $\Delta T$ will be maintained in a range within the measurement accuracy and stability of the controller. In practice, such a method adds expense and reduces reliability.

In a further effort to overcome the cycling problem in non-variable speed pump systems, W. H. Hapgood, in U.S. Pat. No. 4,063,545 which issued on Dec. 20, 1977, describes a solar collector loop in which a thermostat detects the collector panel temperature as unaffected by the fluid flow. The thermostat then controls the pump as a function of the unloaded temperature of the panel.

SUMMARY OF THE INVENTION

It is therefore an object of this invention to provide a method of providing stable control for a solar collector loop based on the actual rate of collection of solar energy.

This and other objects are achieved in a solar collector loop by determining the temperature $T_C$ of the collector absorber plate, the stagnation temperature $T_Q$ of the collector absorber plate and the temperature $T_S$ of the storage unit. The pump is turned on when the temperature difference $\Delta T_C = T_C - T_S$ or $\Delta T_{CQ} = T_Q - T_S$ is greater than a predetermined value $T_{on}$. Before the pump is turned on, $T_C \approx T_Q$. The pump is turned off when the temperature difference $\Delta T_Q = T_Q - T_S$ is smaller than a predetermined value $T_{off}$.

In accordance with another aspect of this invention, the value $T_{on}$ may consist of a fixed value minus the derivative of $T_Q$ so that the system will respond more quickly to fast rise time radiation. Also, the value $T_{off}$ may consist of a fixed value plus the integral of $T_Q$ so that the system response will be delayed by an amount determined by the rate of decrease of the radiation.

Many other objects and aspects of the invention will be clear from the detailed description of the drawings.

DETAILED DESCRIPTION

Figure 1:
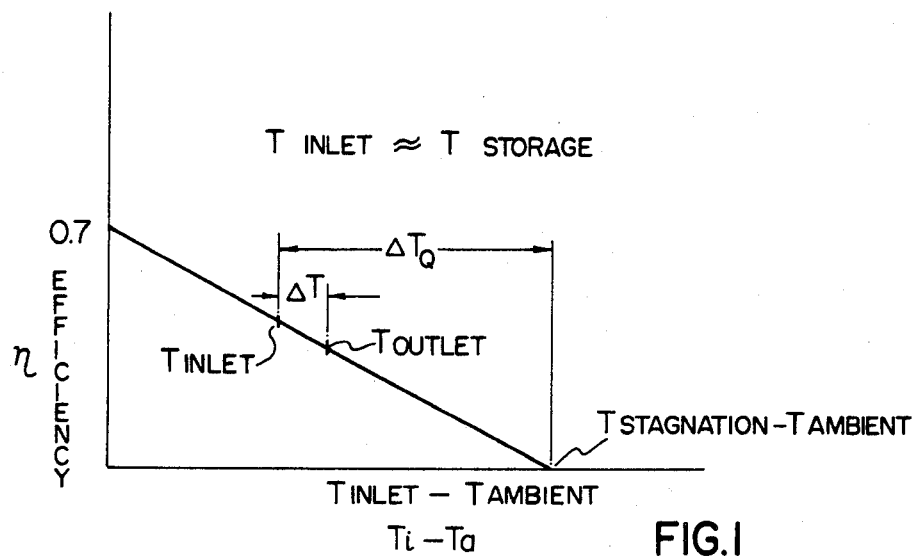
FIG. 1 is a typical characteristic curve of a solar collector panel.

FIG. 1 is the characteristic curve of a typical single glazed collector, operating in the middle of its range. From this characteristic curve it can be seen that $\Delta T_Q$, the ($T_{stagnation} - T_{inlet}$) temperature is much higher than $\Delta T$, the ($T_{inlet} - T_{outlet}$) temperature. $\Delta T_Q$ is also independent of the fluid flow rate through the collector. Thus a more sensitive control of the collector loop based on a direct indication of solar radiation, linked with the collector's performance characteristic at the current temperature conditions of ambient air and circulating fluid, would appear possible.

In order to determine the linearity of $\Delta T_Q$, the standard Hottel and Whillier equation for the collector characteristic must be examined. The useful energy gain from a collector under steady state conditions, is the difference between the amount of solar energy absorbed by the absorber plate and the energy lost to the surroundings. The equation that applies to almost all practical flat-plate collector designs is:

$$Q_u = F_R A[I_T(\tau\alpha) - U_L(T_i - T_a)] \quad (1)$$

where $Q_u$ is the rate at which useful energy is collected (W)

$F_R$ is the collector heat removal efficiency factor

A is the collector area (m²)

$I_T$ is the rate at which solar radiation is incident on the collector surface per unit area (W/m²)

$\tau$ is the solar transmittance of the transparent covers $\alpha$ is the solar absorptance of the collector plate $U_L$ is the collector overall energy loss coefficient (W/°C.—m²)

$T_i$ is the temperature of the fluid entering the collector (°C.)

$T_a$ is the outside ambient temperature (°C.)

In the case of a collector under stagnation temperature conditions $T_i = T_s$, and $Q_u = 0$. The equation reduces to:

$$0 = F_R A[I_T(\tau\alpha) - U_L(T_s - T_a)] \quad (2)$$

In order to determine the sensitivity characteristics of $T_s - T_i$, equations 1 and 2 are solved for this term, and $$T_s - T_i = Q_u / (F_R U_L A) \quad (3)$$

It is to be noted that equation 3 is independent of $I_T$ and $T_a$. Since $F_R$, $U_L$ and A are constant for a given system, $$Q_u = K(T_i - T_s) \quad (4)$$

This equation will be linear for low values of ($T_s - T_i$). Since $Q_u$ is the useful energy collected, and the pumping power is known from the system design (or easily measured), equation 4 indicates that control of the system turn-off can be based entirely on system coefficient of performance (C.O.P.), down to the limit of the ability to measure $T_s - T_i$ in an accurate manner, where $$C.O.P. \frac{\text{energy collected } (Q_u) + \text{energy of the pump}}{\text{energy of the pump}}$$

For a typical single glazed collector,
$F_R = 0.7$
$U_L = 6.3$ w/cm$^2$
Normalizing equation 3 to 1 square meter area $$Q_u = 4.4(T_s - T_i) \tag{5}$$

Assuming a minimum $T_s - T_i$, based on long term stability of temperature sensors, of 1.5° C. Then $$Q_{u(min)} = \frac{(4.4)(1.5)}{0.5} = 6.6 \text{ w/m}^2$$

Since a typical collector can collect over 700 w/m$^2$ under peak conditions, this indicates that the lower limit for stable control of the system will be down to about 1% of peak value. Under these conditions, a standard differential controller would have to operate at 1% of 10° C., or 0.1° C., which is only possible when very expensive instrumentation is used. In addition, for a typical solar loop, having a collector area of approximately 60 m$^2$, the pumping power/m$^2$ would approximately 14.3 w/m$^2$. Therefore, the C.O.P. at turn-off conditions could be as low as:

$$\frac{14.3 + 6.6}{14.3} = 1.46$$

Therefore, the pump may be turned off in a reliable manner at a C.O.P. below 2:1. In the case of a double glazed collector, the $T_s - T_i$ signal would be even higher because of the flatter characteristic curve of the collector.

Figure 2:
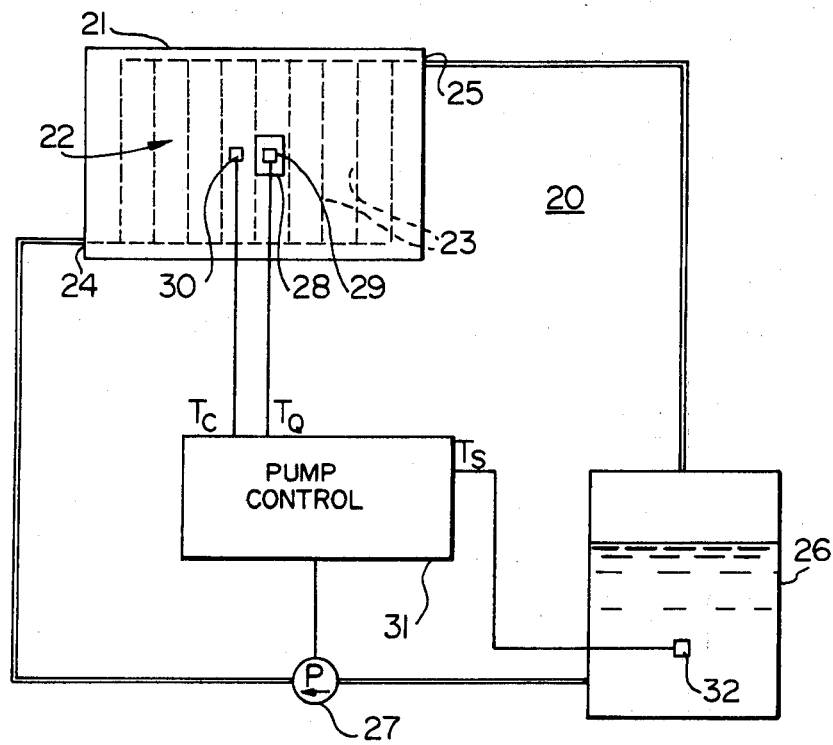
FIG. 2 illustrates a solar collector loop in accordance with this invention.

A typical simple solar collector loop 20 is illustrated in FIG. 2. The fluid loop includes the collector panel 21 having an absorber plate 22 upon which the radiation impinges and tubing 23 fixed to the plate 22 through which the liquid flows from inlet 24 to outlet 25. Collector 21 may be a typical tube-in-plate type of collector such as the liquid flat plate collector described in the Thermo Solar Inc. specification sheet 07A 1-8, through other types of collectors may also be used with this invention. The fluid in the collector 21, which is usually water, antifreeze or even air, flows to the storage tank 26 which may be made of steel, concrete or other material, and may also include a heat exchanger unit for storing the heat in another medium. The fluid is pumped by a pump 27 back to the inlet 24 of the collector 21.

In order to control the heat collection by pump 27, various temperatures in the system are measured. These include the stagnation temperature of the collector 21 panel which is measured to a good approximation by transducer 28. The heat flux transducer 28 may be made in two main physical configurations depending on the type of collector in use.

If the collector absorber plate is constructed in the most common tube-in-plate manner, and if the efficiency parameters are well established, the transducer 28 can be constructed in a simple and economical manner. A stagnation sample is cut out of the absorber plate, fastened back in place, with minimum thermal bridging to the main plate. It is preferred that the transducer 28 be located near the center of the panel to see average conditions. This transducer 28 has the maximum output. Temperature sensors 29, 30, such as thermistors, are bonded to both the stagnation transducer 28 and the main plate 22, respectively, by which the stagnation and collector plate 22 temperatures are measured. If the absorber plate is a 100% wetted surface collector, such as the M419 or M429 collector panels described in the Southwest Ener-Tech Inc. specification sheet, a section cannot be cut out. In this case, the transducer would be constructed much like a standard heat flux gauge, with a calibrated value of thermal bridging to the main absorber plate 22. A sample of the plate, having the same solar radiation absorption and thermal mass characteristics, would be bonded to a thin slice of a stable insulating material such as cork, and the assembly would be bonded to the absorber. This configuration would have a lower output, depending on the thickness of the cork. Again a temperature sensor would be connected to the transducer. These heat flux transducers provide an output signal which is a good representation of the actual stagnation temperature of the collector.

The remaining temperatures which are required to control the loop 20 are the storage temperature $T_S$ and the collector absorber plate temperature $T_C$. $T_C$ is measured by a temperature detector 30 fixed to the absorber plate 22 at the same level as transducer 28. $T_C$ is, therefore, the temperature of the absorber plate 22 somewhere between the inlet and the outlet, however, it is preferred that it measure the temperature above the mid-point of the plate 22 but below the outlet 25. $T_S$ is measured by a temperature detector 32 in the storage unit. These temperature signals are all fed to the pump control unit 31.

Figure 3:
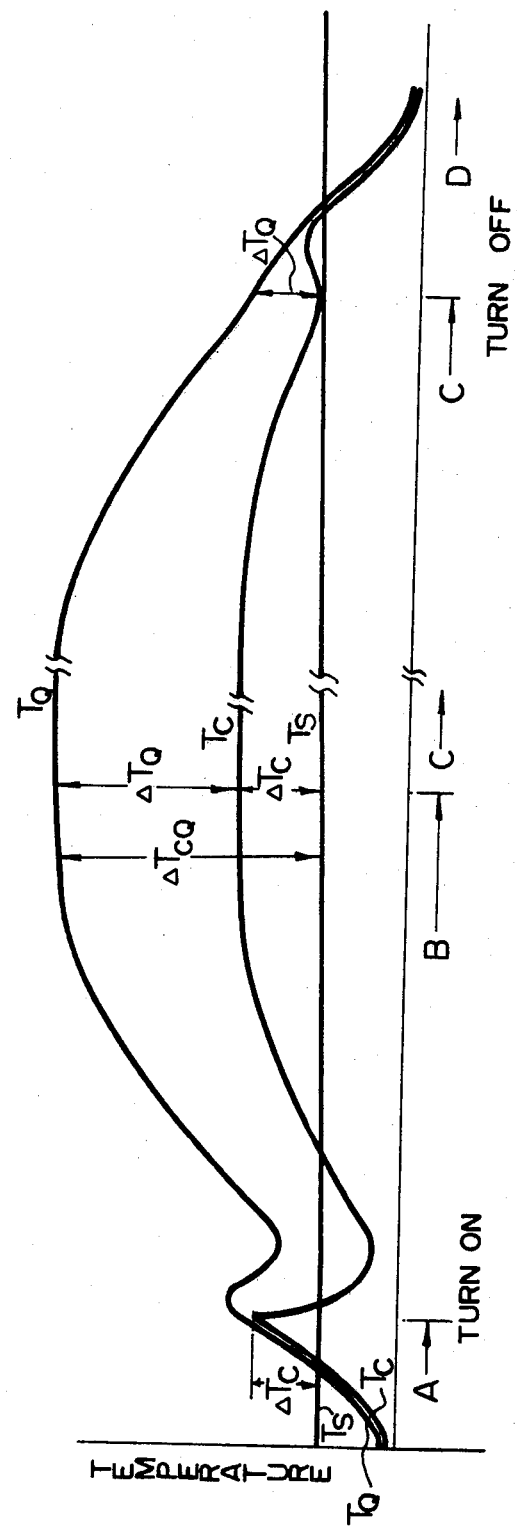
FIG. 3 is a plot of the temperatures $T_Q$, $T_S$, and $T_C$ during the operation of a solar collector loop in accordance with this invention.

These three measured temperatures, $T_S$, $T_C$ and $T_Q$, are plotted in FIG. 3 which is divided in sector A—up to turn-on; B—transients after turn-on; C—the steady-stage situation up to turn-off; and D—after turn-off. In sector A, it is seen that until the pump is turned-on and while the absorber plate 22 is heated by the sun, the stagnation temperature $T_Q$ and the collector temperature $T_C$ are very nearly equal. During this time, the storage temperature $T_S$ remains very nearly constant.

To control the turn-on of the pump 27, the temperature difference between the absorber plate and the storage unit is calculated. The calculated temperature difference may be $\Delta T_c = T_c - T_s$ or $\Delta T_{CQ} = T_Q - T_S$ since $T_C \approx T_Q$ at this point in time and, therefore, $\Delta T_C \approx \Delta T_{CQ}$. When $\Delta T_C$ or $\Delta T_{CQ}$ exceeds a predetermined value $T_{on}$, the pump 27 is switched on. $T_{on}$ would usually be set at approximately 2° C. rather than the 10° C. difference required in conventional systems.

As soon as the pump 27 is turned on, the collector temperature $T_C$ drops since the collector plate 22 is cooled by the circulating fluid. The amount of this temperature drop below the storage temperature $T_S$ will depend on the length of the piping between the storage 26 and the collector 21, and the thermal mass of the pipes and liquid in these pipes. In conventional collector control systems, this is the time that certain instabilities occur since $\Delta T_C$ not only decreases, but may become negative.

The stagnation temperature $T_Q$ also shows somewhat of a drop due mainly to its environment, however, it is noted that at the point of turn-on, $\Delta T_Q$ starts to increase and reaches a steady-state temperature difference a period of time after turn-on. Therefore, as soon as the pump 27 is turned-on, the pump control unit 31 switches to maintain the pump-on until such time that $\Delta T_Q$, the difference between the stagnation temperature $T_Q$ and the collector temperature $T_C$ reaches a predetermined minimum value $T_{off}$. As seen in the example given about, this temperature difference is in the order of 1.5° C.-2° C. below which the pump C.O.P. drops below 1.5. This turn-off point is illustrated in FIG. 3.

The pump control unit 31, therefore, includes control logic to compute $\Delta T_Q = T_Q - T_C$ with a threshold circuit to control the turn-on of pump 27. In addition, the control logic computes $\Delta T_Q = T_Q - T_C$ with a threshold circuit to control the turn-off of pump 27.

In view of the availability of the temperature signals $T_S$, $T_C$ and $T_Q$ at the control unit 31, as well as the control logic in the unit 31, various safety controls may be implemented. For instance, if $T_C > T_Q$, it is evident that some form of malfunction has occurred and the pump 27 should remain off. Also, if $T_S > T_C$ or $T_Q$, the pump should not be running.

It may also be desirable to take into account transient radiation conditions, such as passing clouds. Under the present turn-on control, i.e. $\Delta T_C > 2°$ C., the pump 27 is turned on after a slight delay even though a high radiation level exists suddenly. This may be compensated by setting the turn-on of the pump at a value which takes into account $\Delta T_C$ as well as the derivatives of $T_Q$ which is directly related to the radiation level. Thus, turn-on may be set when $$\left( \Delta T_C - \frac{dT_Q}{dt} \right)$$

is equal in value to a temperature difference of 1° C. to 2° C. In the same manner, turn-off may be delayed somewhat if a radiation drop is caused by a passing cloud. This may be accomplished by adding the integral of $T_Q$ to $\Delta T_Q$. Thus the length of the turn-off delay depends directly on the history of the radiation level prior to the sudden drop in radiation level.

Many modifications in the above described embodiments of the invention can be carried out without departing from the scope thereof and, therefore, the scope of the present invention is intended to be limited only by the appended claims.

I claim:

1. A method of controlling a solar collector loop having a solar collector with an absorber plate, a heat storage unit and a pump for circulating a fluid between the collector and storage, comprising:
   determining the temperature $T_C$ of the collector absorber plate;
   determining the stagnation temperature $T_Q$ of the collector absorber plate;
   determining the temperature $T_S$ of the storage unit;
   computing the difference $\Delta T_C$ between the collector temperature $T_C$ and the storage temperature $T_S$;
   turning the pump on when $\Delta T_C$ is greater than a predetermined value $T_{on}$;
   computing the difference $\Delta T_Q$ between stagnation temperature $T_Q$ and the collector temperature $T_C$; and
   turning the pump off when $\Delta T_Q$ is smaller than a predetermined value $T_{off}$.

2. A method of controlling a solar collector loop having a solar collector with an absorber plate, a heat storage unit and a pump for circulating a fluid between the collector and storage, comprising:
   determining the temperature $T_C$ of the collector absorber plate;
   determining the stagnation temperature $T_Q$ of the collector absorber plate;
   determining the temperature $T_S$ of the storage unit;
   computing the difference $\Delta T_{CQ}$ between the stagnation temperature $T_Q$ and the storage temperature $T_S$;
   turning the pump on when $\Delta T_{CQ}$ is greater than a predetermined value $T_{on}$;
   computing the difference $\Delta T_Q$ between the stagnation temperature $T_Q$ and the collector temperature $T_C$; and
   turning the pump off when $\Delta T_Q$ is smaller than a predetermined value $T_{off}$.

3. A method as claimed in claim 1 or 2 where $T_{on}$ consists of a fixed value minus the derivative of $T_Q$.

4. A method as claimed in claim 1 or 2 where $T_{off}$ consists of a fixed value plus the integral of $T_Q$.

* * * * *